US009948579B1

(12) United States Patent
Sivaramakrishnan

(10) Patent No.: US 9,948,579 B1
(45) Date of Patent: Apr. 17, 2018

(54) NIC-BASED PACKET ASSIGNMENT FOR VIRTUAL NETWORKS

(71) Applicant: Juniper Networks, Inc., Sunnyvale, CA (US)

(72) Inventor: Rajagopalan Sivaramakrishnan, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 204 days.

(21) Appl. No.: 14/673,272

(22) Filed: Mar. 30, 2015

(51) Int. Cl.
H04L 12/861 (2013.01)
H04L 29/08 (2006.01)
H04L 12/713 (2013.01)

(52) U.S. Cl.
CPC ........ *H04L 49/9036* (2013.01); *H04L 45/586* (2013.01); *H04L 67/2842* (2013.01)

(58) Field of Classification Search
CPC .................................................... H04L 45/586
See application file for complete search history.

(56) References Cited

U.S. PATENT DOCUMENTS

| 7,627,899 B1* | 12/2009 | Tripathi | H04L 63/1458 726/25 |
| 8,761,187 B2 | 6/2014 | Barde | |
| 8,990,799 B1* | 3/2015 | Forecast | G06F 9/45558 718/1 |
| 9,356,866 B1* | 5/2016 | Sivaramakrishnan | H04L 45/7453 |
| 9,384,033 B2* | 7/2016 | Jain | G06F 9/45558 |
| 2010/0054260 A1* | 3/2010 | Pandey | H04L 49/00 370/395.53 |
| 2010/0153514 A1* | 6/2010 | Dabagh | G06F 13/4022 709/213 |
| 2011/0314469 A1* | 12/2011 | Qian | H04L 49/9057 718/1 |
| 2012/0099602 A1* | 4/2012 | Nagapudi | H04L 12/4633 370/401 |
| 2012/0170584 A1* | 7/2012 | Christophersen | H04L 45/38 370/392 |
| 2013/0061047 A1* | 3/2013 | Sridharan | H04L 45/586 713/162 |

(Continued)

FOREIGN PATENT DOCUMENTS

WO 2013184846 A1 12/2013

OTHER PUBLICATIONS

"Intel VMDq Technology: Notes on Software Design Support for Intel VMDQ Technology," Intel Corporation, Revision 1.2, Mar. 2008, 22 pp.

(Continued)

*Primary Examiner* — Lashonda Jacobs
(74) *Attorney, Agent, or Firm* — Shumaker & Sieffert, P.A.

(57) ABSTRACT

In some examples, a computing device includes one or more processors configured to execute a plurality of virtual machines; and a network interface card (NIC) coupled to the one or more processors and configured to receive configuration data defining a plurality of receipt queues of the NIC and associated with respective virtual machines of the plurality of virtual machines. The NIC is further configured to assign, based on respective virtual machine identifiers of packets received by the NIC, the packets to the plurality of receipt queues associated with the respective virtual machines.

32 Claims, 10 Drawing Sheets

(56) References Cited

U.S. PATENT DOCUMENTS

| | | | | |
|---|---|---|---|---|
| 2013/0287026 A1* | 10/2013 | Davie | ............... | H04L 49/70 |
| | | | | 370/392 |
| 2014/0185616 A1* | 7/2014 | Bloch | ............ | G06F 9/45533 |
| | | | | 370/392 |
| 2015/0081863 A1* | 3/2015 | Garg | ............... | H04L 41/00 |
| | | | | 709/223 |
| 2015/0271244 A1* | 9/2015 | Bloch | ............... | H04L 67/02 |
| | | | | 709/217 |
| 2016/0373337 A1* | 12/2016 | DeCusatis | ........... | H04L 45/14 |

OTHER PUBLICATIONS

"Vhost Sample Application—DPDK documentation," DPDK Organization, retrieved from http://dpdk.org/doc/guides/sample_app_ug/vhost.html on Feb. 19, 2015, 16 pp.

"Intel 82599 10 GbE Controller Datasheet," Intel Corporation, Revision 3.1, Feb. 1, 2015, 1052 pp.

Jones, "Virtio: An I/O Virtualization framework for Linux," IBM, DeveloperWorks, Jan. 29, 2010, 7 pp.

\* cited by examiner

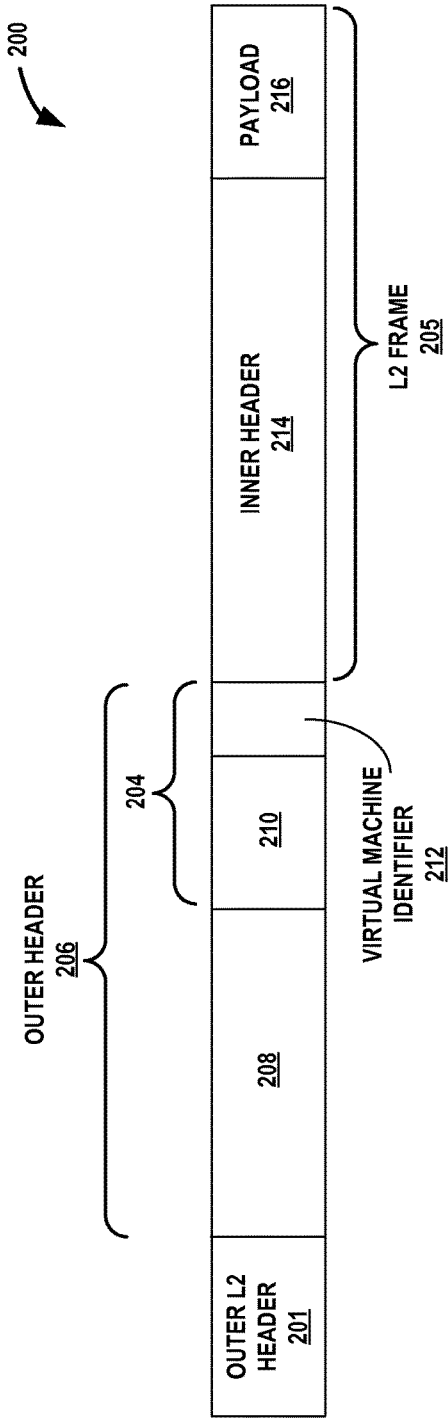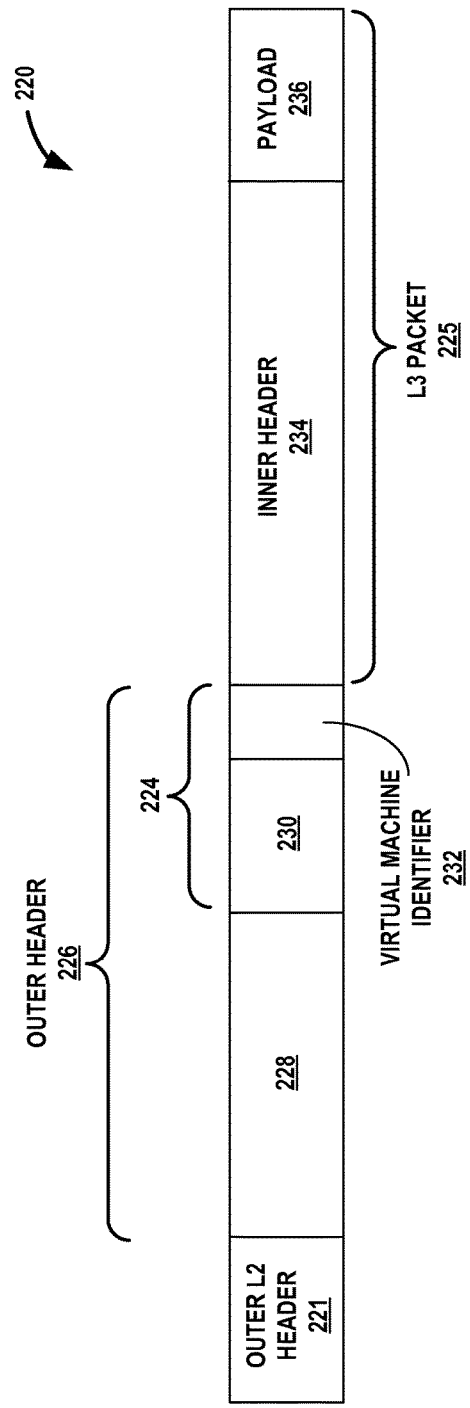

NIC-BASED PACKET ASSIGNMENT FOR VIRTUAL NETWORKS

TECHNICAL FIELD

Techniques of this disclosure relate generally to computer networks and more particularly to virtual networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

SUMMARY

In general, techniques are described for classifying inbound packets with a network interface card (NIC) and directly sending packet data for inbound packets from the NIC to destination virtual machines executing on a computing device. For example, a server or other computing device may execute a virtual router (or "virtual switch") that routes packets received by the server to one or more virtual machines executing within a virtualization environment provided by the server. A NIC of the server may receive tunnel packets and be configured to identify a destination virtual machine for a tunnel packet based on a virtual machine identifier within an outer header of the tunnel packet. Upon identifying the destination virtual machine in this way, the NIC may directly send packet data for the tunnel packet to the destination virtual machine. In some examples of directly sending packet data, the NIC may write the packet data to a memory location for an address space of the destination virtual machine using, e.g., a Direct Memory Access (DMA) transfer.

The techniques may be applied to facilitate virtual networks each implemented at least in part by an overlay network within a physical network having a switch fabric formed by a plurality of switches. A plurality of servers is interconnected by the switch fabric, and each of the servers provides a virtualization environment executing virtual machines in communication via the overlay networks. A set of virtual routers operating within the servers and/or other devices of the physical network extends a given overlay network as a virtual network to the operating environment of the virtual machines that belong to the virtual network. For an inbound packet tunneled to the server using an overlay network, the virtual router may remove the tunnel encapsulation header that identifies the corresponding virtual network and deliver the tunneled packet to the destination virtual machine. The virtual network may support various encapsulation types, including MPLS over GRE and MPLS over UDP. In such cases, the MPLS label in the tunnel encapsulation header of an inbound packet received by a server may not only identify a virtual network but may also represent a virtual machine identifier that uniquely identifies a virtual machine executing on the server.

Configuring the NIC to send, based on a virtual machine identifier, packet data for a tunnel packet directly to a destination virtual machine may relieve the virtual router executing on the server of sending the packet data to the destination virtual machine. As a result, the techniques may improve memory utilization, reduce CPU utilization, and/or reduce memory bus utilization for the server.

In one example, a method includes receiving, by a network interface card (NIC) of a computing device, configuration data defining a plurality of receipt queues of the NIC and associated with respective virtual machines executing on the computing device. The method also includes assigning, by the NIC and based on respective virtual machine identifiers of packets received by the NIC, the packets to the plurality of receipt queues associated with the respective virtual machines.

In another example, a method includes receiving, by a network interface card (NIC) of a computing device, a packet. The method also includes sending, by the NIC based on a Multiprotocol Label Switching label of the packet, packet data of the packet directly to a virtual machine of a plurality of virtual machines executed by the computing device.

In another example, a computing device includes one or more processors configured to execute a plurality of virtual machines; and a network interface card (NIC) coupled to the one or more processors and configured to receive configuration data defining a plurality of receipt queues of the NIC and associated with respective virtual machines of the plurality of virtual machines. The NIC is further configured to assign, based on respective virtual machine identifiers of packets received by the NIC, the packets to the plurality of receipt queues associated with the respective virtual machines.

In another examples, a computing device includes one or more processors configured to execute a plurality of virtual machines; and a network interface card (NIC) coupled to the one or more processors and configured to receive a packet. The NIC is further configured to send, based on a Multiprotocol Label Switching label of the packet, packet data of the packet directly to a virtual machine of the plurality of virtual machines.

In another example, a non-transitory computer-readable medium comprises instructions for causing one or more programmable processors to receive, by a network interface card (NIC) of a computing device, configuration data defining a plurality of receipt queues of the NIC and associated with respective virtual machines configured for execution by the one or more programmable processors; and assign, by the NIC and based on respective virtual machine identifiers of packets received by the NIC, the packets to the plurality of receipt queues associated with the respective virtual machines.

In another example, a non-transitory computer-readable medium comprises instructions for causing one or more programmable processors to receive, by a network interface card (NIC) of a computing device, a packet; and send, by the NIC based on a Multiprotocol Label Switching label of the packet, packet data of the packet directly to a virtual machine of a plurality of virtual machines configured for execution by the one or more programmable processors, wherein sending the packets directly to the virtual machine comprises sending the packets to the virtual machine without a software-based virtual router executed by a general-purpose processor of the computing device accessing the Multiprotocol Label Switching label of the packet.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 5A-5B are block diagrams illustrating examples of tunnel packets that may be processed by a computing device according to techniques described in this disclosure.

Like reference characters denote like elements throughout the figures and text.

DETAILED DESCRIPTION

Figure 1:
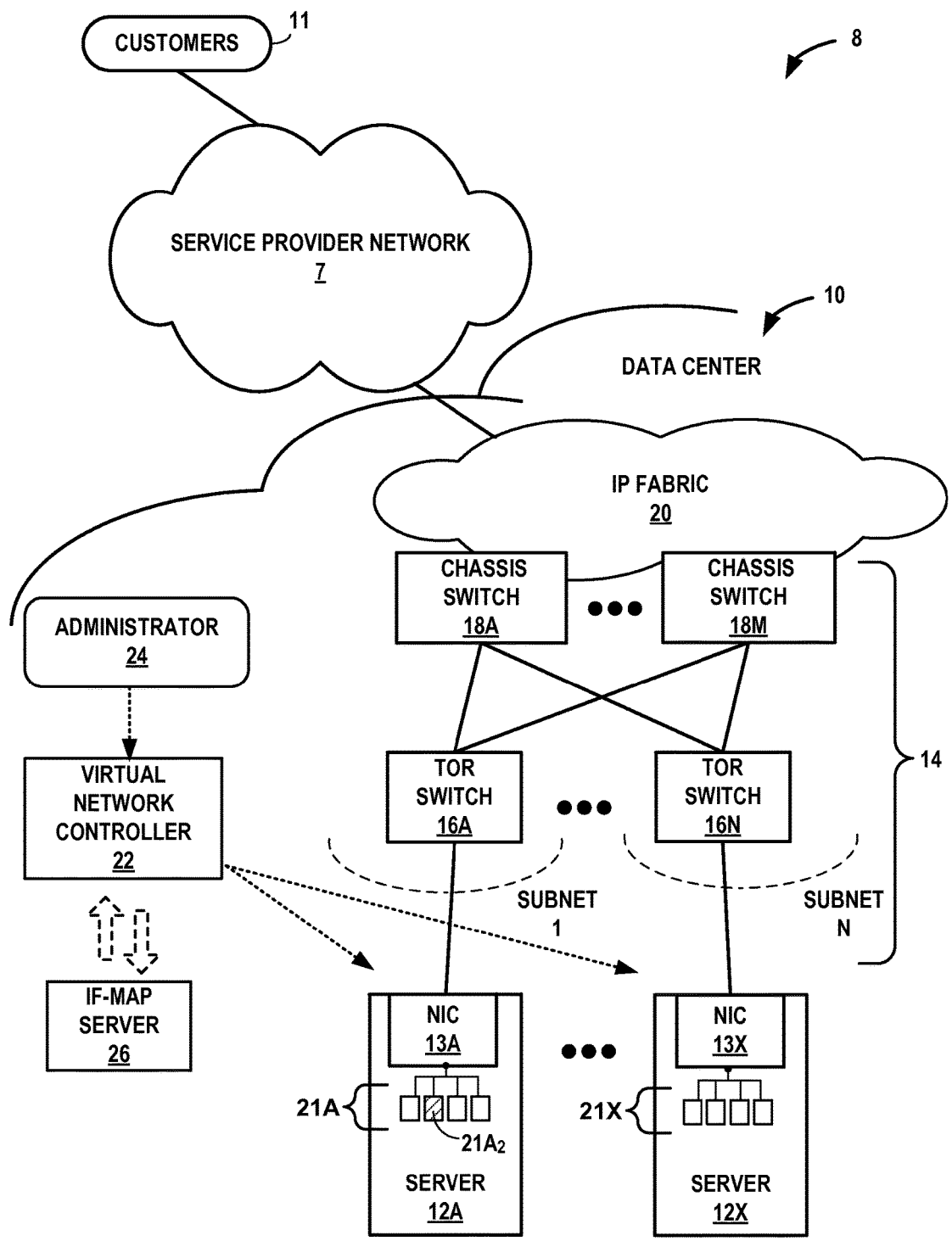
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 by service provider network 7.

Virtual network controller 22 ("VNC") provides a logically and in some cases physically centralized controller for facilitating operation of one or more virtual networks within data center 10 in accordance with one or more embodiments of this disclosure. In some examples, virtual network controller 22 may operate in response to configuration input received from network administrator 24. Additional information regarding virtual network controller 22 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

Typically, the traffic between any two network devices, such as between network devices within IP fabric 20 (not shown) or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node.

A packet flow or, more simply, "flow" can be defined by the five values used in a header of a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Each of servers 12 may provide a virtualization environment that executes one or more virtual machines 21. In the illustrated example, server 12A executes virtual machines 21A, including virtual machine $21A_2$, and server 12X executes virtual machine 21X. Each of the virtual machines 21 is associated with a particular virtual network within data center 10.

One or more of servers 12 may each include a virtual router that executes multiple routing instances for corresponding virtual networks within data center 10. Packets received by server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a tunnel encapsulation header, which may include a virtual network identifier such as a VxLAN tag or Multiprotocol Label Switching (MPLS) label that identifies one of the virtual networks as well as the corresponding routing instance executed by the virtual router. In some cases, the outer header includes a virtual machine identifier that uniquely identifies, to a server 12, a virtual machine executing on the server 12. The virtual machine identifier may be at least a portion of the virtual network identifier. For example, an MPLS label of a tunnel encapsulation header of an outer header for a packet may represent a virtual machine identifier that uniquely identifies a virtual machine executing on a server 12 to which the packet is destined. An inner packet includes an inner header having a destination L2 address and/or destination network address that conforms to the virtual network addressing space for the virtual network identified by the virtual network identifier.

Servers 12 include respective network interface cards 13A-13X (collectively, "NICs 13") by which servers 12 exchange packets with the switch fabric 14. NIC 13A, for example, includes one or more interface ports for transmitting and receiving packets via links coupling NIC 13A to TOR switch 16A. In some cases, NIC 13A may be coupled to multiple switches. In some cases, server 12A includes multiple NICs. Network interface cards may alternatively be referred to as "network interface controllers."

In accordance with techniques described in this disclosure, NIC 13A is configured to directly send packet data for inbound tunneled packets to destination virtual machines 21 executing on server 12A. For example, NIC 13A may be configured to receive an inbound packet having an outer header. NIC 13A may identify destination virtual machine $21A_2$ for the inbound packet using a virtual machine identifier included in the outer header. Upon identifying virtual machine $21A_2$, NIC 13A may then directly send packet data for the inbound packet to the virtual machine $21A_2$. Although described with respect to virtual machine $21A_2$, NIC 13A may be configured to receive and directly send packet data in this way to any of virtual machines 21.

In some examples, NIC 13A directly sends packet data for a packet to virtual machine $21A_2$ by writing the packet data to an address space of virtual machine $21A_2$ using, e.g., a Direct Memory Access (DMA) transfer. NIC 13A may in this way eschew writing the packet data to an address space of the virtual router executed by server 12A. As a result, the virtual router need not copy at least a portion of the packet data from the address space of the virtual router to the address space of virtual machine $21A_2$ upon the virtual router identifying the virtual machine $21A_2$ using the inner header of the packet. The described techniques may therefore improve memory and/or memory bus utilization and, at least in some cases, increase the rate at which server 12A may receive and process inbound packets. In some cases, each of the address spaces for each of virtual machines 21 is isolated from one another. In such cases in other words, each of virtual machines 21 has a unique or separate address space and the virtual machines 21 do not share address space with one another.

Figure 2A:
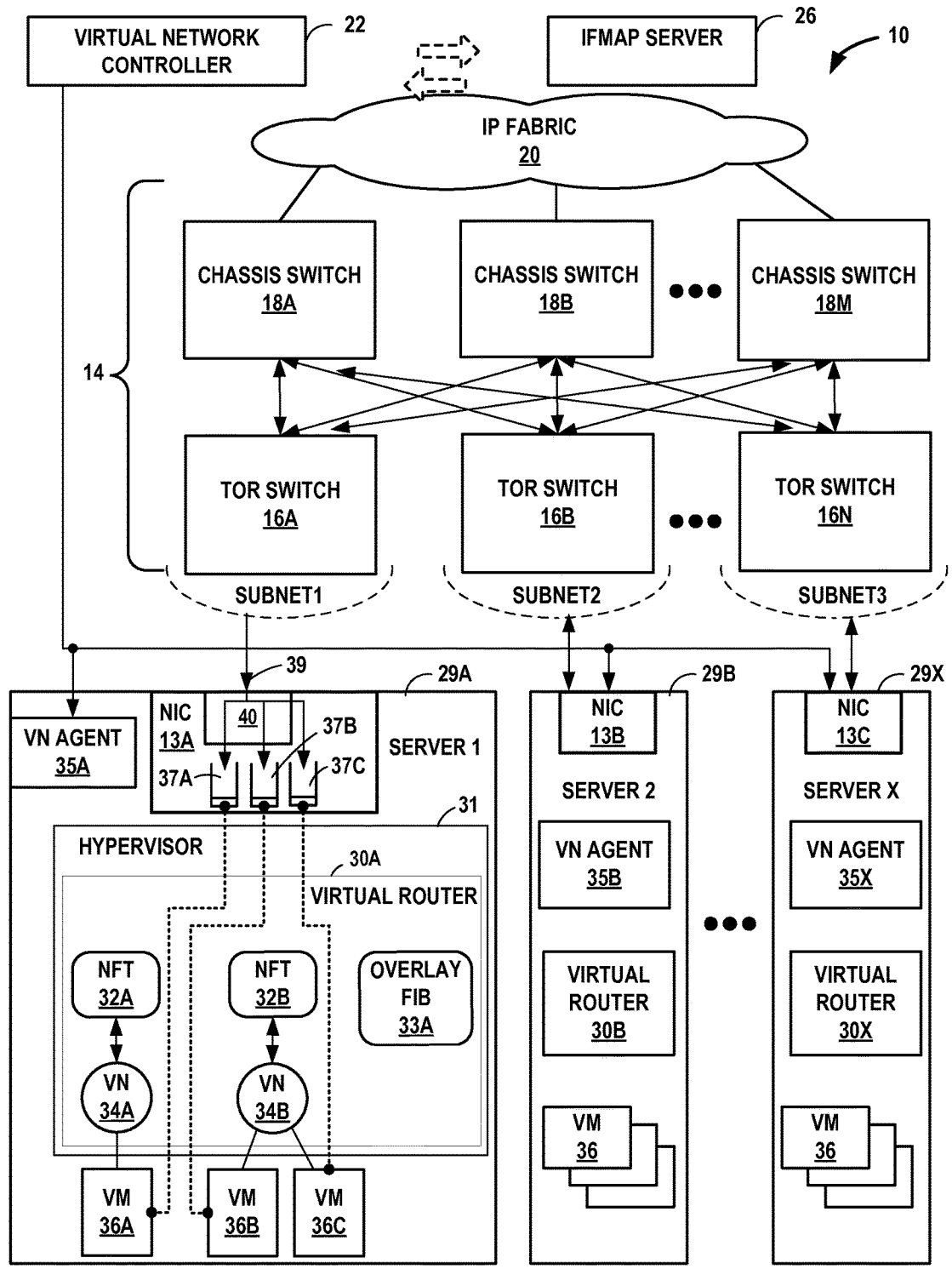
FIGS. 2A-2B are block diagrams illustrating example implementations of data center 10 of FIG. 1 in further detail.
Figure 2B:
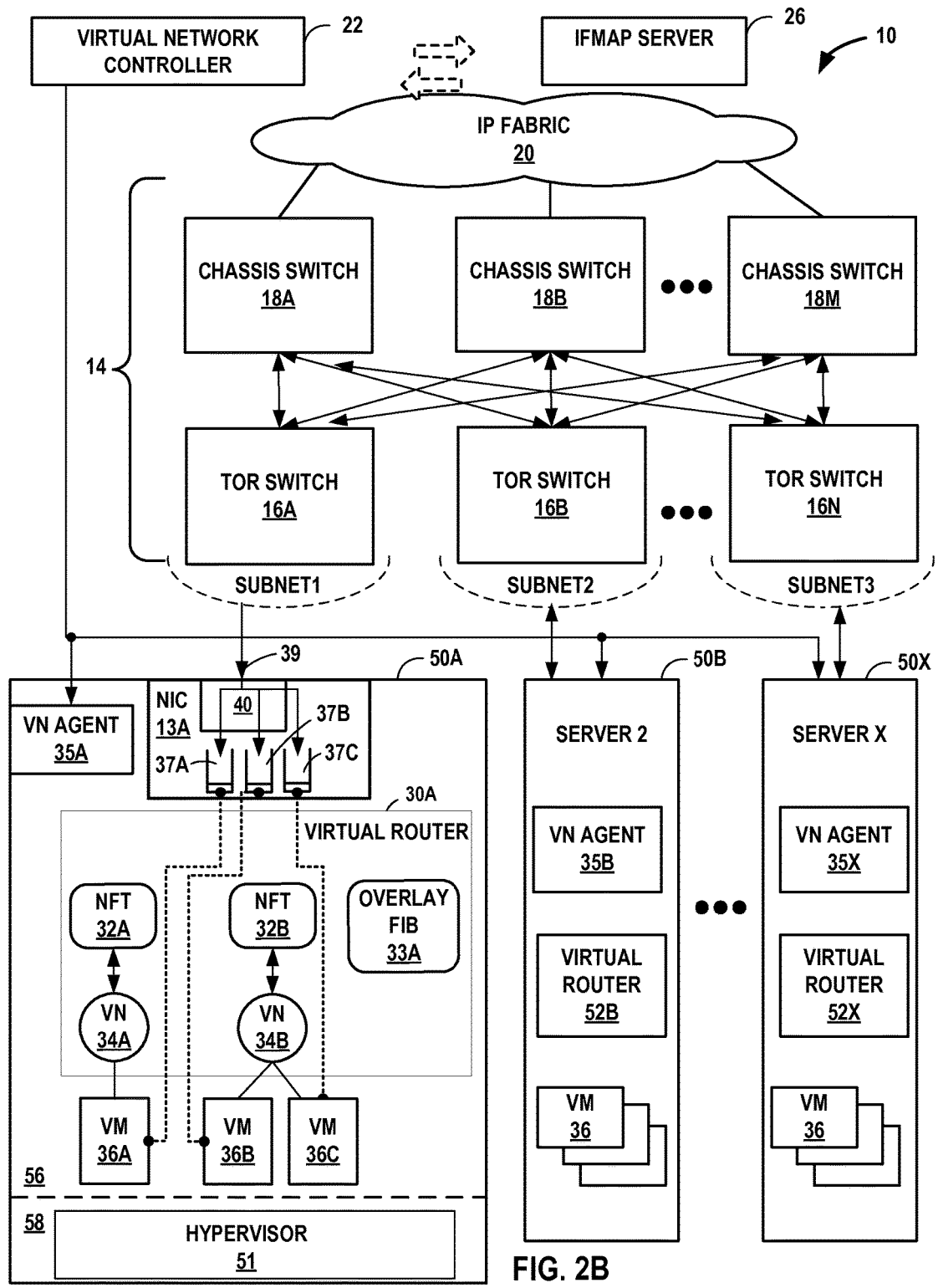

FIGS. 2A-2B are block diagrams illustrating example implementations of data center 10 of FIG. 1 in further detail. In the examples of FIGS. 2A-2B, data center 10 includes an overlay network that extends switch fabric 14 from physical switches 16, 18 to software or "virtual" switches 30A-30X (collectively, "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 29A-29X ("servers 29") on which the application is executing. Servers 29 may represent example instances of servers 12 of FIG. 1. Each virtual network may use its own addressing and security scheme and may be viewed as orthogonal from the physical network and its addressing scheme. Various techniques may be used to transport packets within and across virtual networks 34 over the physical network. In some examples, the techniques described in this disclosure provide multicast service within virtual networks 34 without requiring multicast support in the underlying physical network.

Each virtual router 30 may execute within a hypervisor, a host operating system or other component of each of servers 29. Each of servers 29 may represent an x86-based, PowerPC-based, or other general-purpose or special-purpose server capable of executing virtual machines 36. Servers 29 may be located within data center 10 racks. Hypervisor 31, also often referred to as a virtual machine manager (VMM), provides a virtualization platform/environment that allows multiple guest operating systems to concurrently run on one of servers 12. An operating system kernel (not shown in FIGS. 2A-2B) may execute in kernel space and may include, for example, a Linux, Berkeley Software Distribution (BSD), another Unix-variant kernel, or a Windows server operating system kernel, available from Microsoft Corp. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information may execute a portion of the virtual router 30A.

In the example of FIG. 2A, virtual router 30A is a kernel-level module executing within kernel space. In the example of FIG. 2B, virtual router 30A executes in user space 56 rather than in kernel space 58 of server 50A (an example instance of servers 12 of FIG. 1, in other respects similar to servers 29 of FIG. 2A). In general, user space 56 is allocated for running user processes, while kernel space 58 is protected and generally inaccessible by user processes. Additional details regarding instances of the techniques of this disclosure implemented using a virtual router executing in user space are described below with respect to FIG. 7.

Virtual router 30A manages virtual networks 34A-34B (collectively, "virtual networks 34"), each of which provides a network environment for execution of one or more virtual machines (VMs) 36A-36C (collectively, "virtual machines 36") on top of the virtualization platform provided by hypervisor 31. Each of VMs 36 is associated with one of the virtual networks VNs 34 and may represent tenant VMs running customer applications, such as Web servers, database servers, enterprise applications, or hosting virtualized services used to create service chains. In some cases, any one or more of servers 29 or another computing device may host customer applications directly, i.e., not as virtual machines.

In general, each VM 36 may be any type of software application and may be assigned a virtual address for use within a corresponding virtual network 34, where each of the virtual networks may be a different virtual subnet provided by virtual router 30A. A VM 36 may be assigned its own virtual layer three (L3) IP address, for example, for sending and receiving communications but may be unaware of an IP address of the physical server 12A on which the virtual machine is executing. In this way, a "virtual address" is an address for one of VMs 36, operating within corresponding virtual network 34, that differs from the logical address for the underlying, physical computer system, e.g., server 12A in the example of FIGS. 2A and 2B. As another example, a VM 36 may also be assigned its own virtual layer two (L2) address, for example, for sending and receiving communications in an L2 virtual private network (L2VPN) provided by data center 10 as one of virtual networks 34.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 29. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10 to create one or more overlay networks each implementing one of virtual networks 34. Besides IPinIP, other example tunneling protocols that may be used include IP over GRE, VxLAN, MPLS over GRE (MPLSoGRE), MPLS over UDP (MPLSoUDP), MPLS over MPLS (MPLSoMPLS), etc.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as one or more overlay networks of data center 10. Similarly, switches 16, 18 and virtual routers 30 maintain routing information, such as one or more routing and/or forwarding tables. In one example implementation, virtual router 30A of hypervisor 31 implements respective network forwarding tables (NFTs) 32 for virtual network 34s. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack. For instance, NFT 32A may represent a L2/MAC forwarding information base (FIB) for a Layer 2 overlay network. NFT 32A may alternatively represent an IP FIB for a Layer 3 overlay network.

As one example, virtual machine 36A may send a packet (an example of an "inner packet" or "tunneled packet") to virtual router 30A by an internal link or operation. Virtual router 30A uses NFT 32A to look up a virtual network destination network address for the packet. NFT 32A specifies an outbound interface of virtual router 30A and encapsulation for the packet. Virtual router 30A applies the encapsulation to add a tunnel header to generate an "outer packet" or "tunnel packet" and outputs the outer packet on an outbound interface for server 29A, in this case toward TOR switch 16A.

The forwarding information of NFTs 32 may, for example, map packet key information (e.g., destination IP information, destination MAC information, and/or other select information from packet headers) to one or more specific next hops within the networks provided by virtual routers 30 and switch fabric 14. In some case, the next hops may be chained next hop that specify a set of operations to be performed on each packet when forwarding the packet, such as may be used for flooding next hops and multicast replication.

As noted above, the forwarding information of NFTs 32 may include tunnel encapsulation information for implementing the type of overlay network for the corresponding virtual network. (Typically, each of VNs 34 implements the same type of overlay network.) For example, for an MPLSoGRE-based L3 overlay network, an entry in NFT 32 may include a /32 or/128 route to match a destination IP address for a destination virtual machine 36 of VMs 36 executing on server 29B. The corresponding tunnel encapsulation information for the entry may specify a GRE header for routing within the core (switches 16, 18 switch based on the outer header), as well as an MPLS label that uniquely identifies the destination virtual machine 36, among VMs 36 of server 29B, to components of server 29B. The MPLS label may be allocated by virtual router 30B or by VNC 22, for instance, to be locally significant to server 29B. In some examples, virtual routers 30 may allocate MPLS labels (or other virtual machine identifiers) from an MPLS label space (or other virtual machine identifier type space) reduced from the standard MPLS label space (or other virtual machine identifier type space). For instance, virtual routers 30 may allocate MPLS labels drawn from a reduced MPLS label space defined by fewer than the 20 bits of the standard MPLS label space. In some examples, the reduced MPLS label space is 16 bits/2 bytes.

Overlay FIB 33A includes entries that map tunnel encapsulation information to one of virtual networks 34. Entries of overlay FIB 33A may also, more specifically, map the tunnel encapsulation information to individual VMs 36 of server 29A. For example, again for an MPLSoGRE-based L3 overlay network, an entry in overlay FIB 33A may match an MPLS label and specify one of virtual networks 34. The entry may also, or alternatively, specify one of VMs 36 of server 29A. On receipt of an MPLSoGRE packet of inbound packets 39 from TOR switch 16A, virtual router 30A may strip the GRE header to reveal the MPLS label. Virtual router 30A may then perform a lookup operation with respect to overlay FIB 33A to attempt to identify an entry matching the MPLS label. Upon identifying a matching entry, virtual router 30 removes the MPLS header and injects the inner packet into the matching virtual network 34, which routes the inner packet to the appropriate one of VMs 36 based on destination address information of the inner header for the inner packet.

Thus, as shown in FIGS. 2A-2B, each of virtual networks 34 provides a communication framework for encapsulated packet communications for the overlay networks established through switch fabric 14. In this way, network packets associated with any of virtual machines 36 may be transported as encapsulated packet communications via the corresponding overlay network.

Virtual network controller 22 and virtual routers 30 may communicate in accordance with a default network forwarding table (not shown) during discovery and initialization of an overlay network, and during conditions where a failed link has temporarily halted communication via the overlay network. Once connectivity with the virtual network controller 22 is established, the virtual network controller 22 updates its local routing table to take into account new information about any failed links and directs virtual routers 30 to update their local network forwarding tables 32. For example, virtual network controller 22 may output commands to virtual network agents 35 to update one or more NFTs 32 to direct virtual routers 30 to change the tunneling encapsulation so as to re-route communications within the overlay network, for example to avoid a failed link.

When link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information and may issues messages to other virtual network agents 35 to update local routing information stored by the virtual network agents within network forwarding tables 32.

Servers 29 include respective network interface cards 13A-13C (collectively, "NICs 13"). Each of NICs 13 performs substantially similar functionality, said functionality being described hereinafter with respect to NIC 13A. NIC 13A is configured with a plurality of receipt queues 37A-37C. Each of receipt queues 37 includes a packet buffer for storing packet data for packets received by server and a first-in-first-out (FIFO) data structure that manages the ordering of packets within the FIFO data structure. Each receipt queue of receipt queues 37 is associated with one of VMs 36 such that the associated VM dequeues packets for processing from the receipt queue. For instance, VM 36A dequeues packets from associated receipt queue 37A for processing. Although illustrated as located on-board NIC 13A, aspects of receipt queues 37 may be provided by other components of server 29A, such as system memory. For example, the packet buffers for receipt queues 37 may be located in a system memory of server 39A. As described further below with respect to FIG. 7, the host memory may be mapped to the guest address spaces for VMs 36.

Either or both of the packet buffer or FIFO data structure of each of receipt queues 37 may also be located on-board NIC 13A. For example, NIC 13A may include packet buffer memory for storing packet data. In various examples, the size of the packet buffer on-board NIC 13A is 256 KB, 512 KB, 1 MB, etc. In some examples, however, NIC 13A is configured to use the on-board packet buffer as temporary packet storage while writing packets to the packet buffers in system memory for the receipt queues 37 to which classifier 40 has assigned the packets.

In accordance with techniques described herein, NIC 13A includes classifier 40 that assigns inbound packets, received by NIC 13A from TOR switch 16A, to one of receipt queues 37 based on virtual machine identifiers within the packets. Classifier 40 may represent a microprocessor, at least a portion of an application-specific integrated circuit (ASIC) or field-programmable gate arrays (FPGAs) or other equivalent integrated or discrete logic circuitry. Classifier 40 is configured with configuration data that defines associations between virtual machine identifiers and virtual machines 36 of server 29A. The configuration data may include filters that each match a virtual machine identifier and specify one of virtual queues 37.

Virtual machine identifiers may be included in tunnel encapsulation information for inbound packets 39. For example, the virtual machine identifiers may represent or be a portion of an MPLS label for inbound packets 39 for MPLSoMPLS-, MPLSoGRE-, and MPLSoUDP-based overlay networks.

When inbound packets arrive at NIC 13A, classifier 40 determines the correct receipt queue 37 using the virtual machine identifiers. In other words, classifier 40 assigns inbound packets 39 to one of receipt queues 37 based on the virtual machine identifiers included in the tunnel encapsulation information of the inbound packets. Classifier 40 may then write the packets to their assigned receipt queues 37. The virtual router 30A may then 'route' the packets to the virtual machines 36 corresponding to the receipt queues. The techniques may thus reduce a CPU utilization of virtual router 30A by offloading at least a portion of the routing (or switching) functionality to NIC 13A.

Each of receipt queues 37 thus queues packets for a particular virtual machine 36 of server 29. Virtual machines 36 may obtain packet data for packets directly from corresponding receipt queues 37, rather than from virtual router 30. For example, on receiving an indication that a packet has been enqueued to receipt queue 37A, VM 36A may read from the packet buffer of receipt queue 37A and process the packet. The techniques may thus avoid first writing the packets to the virtual router 30A space in system memory, which may improve bus and/or memory utilization by components of server 29A.

Figure 3:
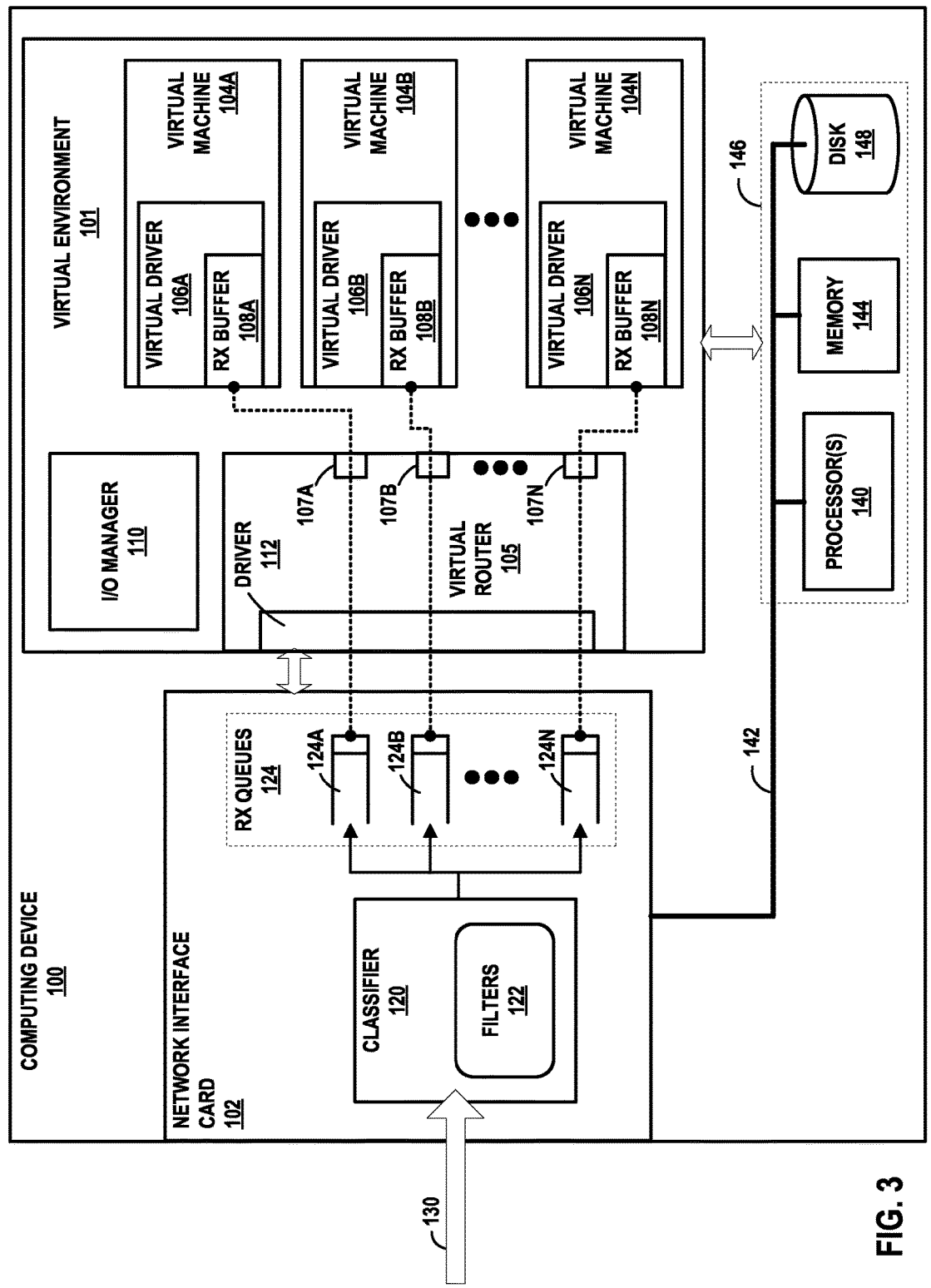
FIG. 3 is a block diagram illustrating a computing device having a configurable network interface card that assigns, based on virtual machine identifiers, packets to receive queues for virtual machines according to techniques described in this disclosure.

FIG. 3 is a block diagram illustrating a computing device having a configurable network interface card that assigns, based on virtual machine identifiers, packets to receive queues for virtual machines according to techniques described in this disclosure. Computing device 100 may represent any of servers 12 of FIG. 1, servers 29 of FIG. 2A, or servers 50 of FIG. 2B, for instance.

Computing device 100 includes in this example a bus 142 coupling hardware components of a computing device 100 hardware environment 146. Bus 142 couples memory 144, network interface cards (NIC) 102, storage disk 107, and one or more hardware-based processors 140. Bus 142 may include separate busses for I/O and system operations, as well as one or more I/O controllers, Direct Memory Access controllers, and switches, for example.

NIC 102 includes interfaces configured to exchange packets using links of an underlying physical network. NIC 102 may represent a Peripheral Component Interconnect (PCI) card having a bus interface that conforms to a PCIe, PCI-X, PCI, or other PCI-based standard. NIC 102 may alternatively have a bus interface that conforms to another bus standard. An I/O bus of bus 142 may represent PCI, PCIe/PCI-E, PCI-X, HyperTransport, Infiniband, I2C, or other types of I/O busses operative to communicatively couple NIC 102 to one or more processor(s) 140 and/or one or more memory devices of memory 144. NIC 102 may represent, for instance, a 82599 10 GbE Network Interface Controller manufactured by Intel© Corporation. Processor(s) 104 may include any number of processors and any number of hardware cores from, for example, four to thousands.

Disk 148 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor(s) 140.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144, NIC 102, storage disk 148, and processor(s) 146 provide an operating environment for a software stack that includes virtual environment 101 for execution of one or more virtual machines 104A-104N (collectively, "virtual machines 104") and an I/O manager 110. Virtual machines 104 may represent example instances of any of virtual machines 21 of FIG. 1 or virtual machines 36 of FIG. 2.

Driver 112 represents a device according to a software device model and provides device driver software routines for handling packets for receipt/transmission by NIC 102. Packets received by NIC 102 from the underlying physical network fabric for the virtual networks may include an outer header to allow the physical network fabric to tunnel the payload or "inner packet" to a physical network address for NIC 102. The outer header may include not only the physical network address but also a virtual network identifier such as a VxLAN tag or Multiprotocol Label Switching (MPLS) label that identifies a virtual network. An inner packet includes an inner header having a destination network address that conform to the virtual network addressing space for the virtual network identified by the virtual network identifier. The outer header further includes a tunnel encapsulation header that includes a virtual machine identifier.

Virtual router 105 "routes" packets among virtual machines 104 and NIC 102. Virtual router 105 may execute in a hypervisor or other VMM of computing device 100 (not shown in FIG. 3), or alternatively in user space. For example, I/O manager 110 may represent a user space process that executes virtual router 105, a separate virtual machine (such as a persistent specialized virtual machine), or other mode of operation. I/O manager 110 provides input/output (I/O) services to enable virtual machines 104 to process network I/O requests generated by software executing in the virtual machines 104 or resulting from a packet received by NIC 102.

Virtual router 105 includes driver 112 and back-end drivers 107A-107N (collectively, "back-end drivers 107"). Virtual router 105 may switch packets (e.g., routing packets at layer 3 or bridging packets at layer 2) to interconnect virtual machines 104, via driver 112, operating on multiple instances of computing device 100 using virtual networks.

Driver 112 in this example represents the physical driver for computing device 100, in that driver 112 is managed by I/O manager 110 to control and operate NIC 102 for computing device 100. Driver 112 may operate as a Poll Mode Driver (PMD) for fast virtual machine 104 to host communication. I/O manager 110 may initialize and configure, via driver 112, NIC 102 with filters 122.

This example of a computing device 100 includes back-end drivers 107 that emulate NIC 102 as virtual hardware to multiple virtual drivers 106A-106N (collectively, "virtual drivers 106") for respective virtual machines 104. In this respect, computing device 100 operates according to a split driver model. Back-end drivers 107 may communicate with virtual drivers 106 (alternatively, "front-end drivers 106") to form an abstraction layer over NIC 102, e.g., in a paravirtualized hypervisor. One example of such an abstraction layer is virtio, and in examples of computing device 100 in which back-end drivers communicate with virtual drivers 106 via virtio, virtual drivers 106 may represent "virtio drivers." Corresponding pairs of drivers 107 and 106 may communicate using, e.g., respective virtio rings or other types of virtual queues.

Virtual router 105 enables NIC 102 to classify and assign inbound packets 130 to one of receipt queues 124A-124N (collectively, "receipt queues 124" and illustrated as "rx queues 124") associated with respective virtual machines 104A-104N based on virtual machine identifiers of the inbound packets. In some examples, moreover, NIC 102 may directly write packet data for the packets to receipt buffers 108A-108N (collectively, "receipt buffers 108" and illustrated as "rx buffers 108") of respective virtual machines 104. For instance, virtual drivers 106 may post, via back-end drivers 107, memory locations of packet buffers within receipt buffers 108 to NIC 102. NIC 102 may write directly to these posted packet buffers, e.g., using a DMA transfer, so as to "send" a classified packet directly to a targeted virtual machine of virtual machines 104. In this way, NIC 102 may directly write packets classified by their respective virtual machine identifier to receipt buffers 108 in the memory spaces of virtual machines 104.

In some examples, however, NIC 102 "sends" a classified packet indirectly to a targeted virtual machine via virtual router 105. For example, virtual router 105 may post packet buffers of virtual router 105 to NIC 102 and performs a CPU memory copy from the packet buffers to the receipt buffer 108 of a targeted virtual machine of virtual machines 104.

Network interface card 102 is configured with receipt queues 124. Receipt queues 124 may represent example instances of receipt queues 37 of FIGS. 2A-2B. As one example of receipt queues 124, receipt queue 124A is associated with virtual machine 104A such that packets assigned to receipt queue 124A by classifier 120 of NIC 102 are directed to virtual machine 104A. Receipt queue 142A includes a FIFO data structure that enqueues packet data and/or packet descriptions by which virtual router 105 may route packet data to the targeted virtual machine 104A.

Classifier 120 applies filters 122 to assign inbound packets to one of receipt queues 124 based on virtual machine identifiers of the inbound packets. In some examples, filters 122 include a filter for each of virtual machines 104. The filter for virtual machine 104A, for instance, matches a virtual machine identifier of inbound packets destined for virtual machine 104A. When applied by classifier 120, the filter causes classifier 120 to assign inbound packets having the virtual machine identifier to receipt queue 124A. Filters 122 may represent examples of flow director filters of the 82599 10 GbE Network Interface Controller manufactured by Intel© Corporation.

To assign an inbound packet to a receipt queue of receipt queues 124, classifier 120 may write a description of the inbound packet to the receipt queue. This description may be included in a data structure known as a "descriptor" or "receipt descriptor." The description may include, e.g., a receive packet buffer address for one of receipt buffers 108 and a length of the inbound packet. In some cases, receipt queues 124 represent "descriptor queues" in host memory and managed by I/O manager 110.

Along with assigning inbound packets to receipt queues 124, NIC 102 or virtual router 105 may "send" packets to targeted virtual machines 104. In some examples, NIC 102 or virtual router 105 may initiate, with a DMA controller, a DMA transfer to cause the DMA controller to read packet data for the packet from a buffer memory of NIC 102 and write the packet data to a packet buffer in one of receipt buffers 108. NIC 102 may write back the location of the packet buffer to a receipt queue 124 as part of enqueuing the packet to the receipt queue 124. Virtual router 105 may subsequently dequeue the location of the packet buffer for the packet from the receipt queue 124 and provide this location to the designated virtual machine 104 for the receipt queue 124. In this way, the virtual machine 104 may receive the packet "routed" by virtual router 105. In some examples, virtual router 105 may copy packet data from packet buffers in memory space for virtual router 105 to receipt buffers 108 in order to "send" the packets to the targeted virtual machines 104.

Figure 4:
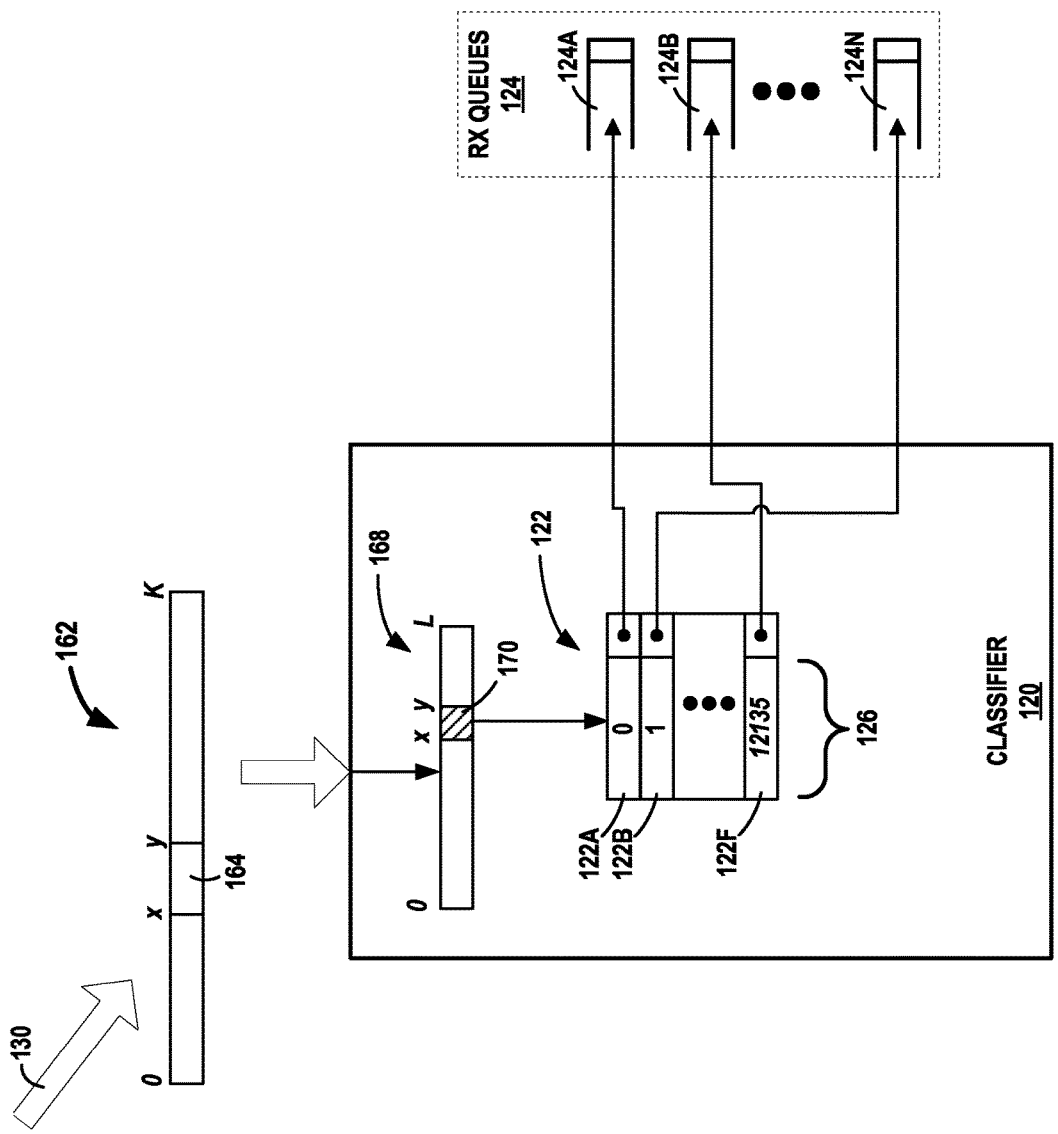
FIG. 4 is a block diagram illustrating example filters for assigning inbound packets to receipt queues based on virtual machine identifiers, according to techniques described herein.

FIG. 4 is a block diagram illustrating example filters for assigning inbound packets to receipt queues based on virtual machine identifiers, according to techniques described herein. Filters 122A-122F include respective match fields 126 that each match a different virtual machine identifier value. For example, filter 122A has a match field 126 that matches virtual machine identifier 0; filter 122B has a match field 126 that matches virtual machine identifier 1; and so on. In some cases, match field 126 of filters 122 includes values that match a hash value for other function applied to the virtual machine identifiers of inbound packets 130. In such cases, for instance, match field 126 has a match field 126 with a hash value of 0, which matches one or more virtual machine identifiers to which classifier applies a corresponding hash function.

Each of filters 122 is associated with one of receipt queues 124. In the illustrated example, for instance, filter 122A is associated with receipt queue 124A. In some examples, multiple filters 122 may be associated with any of receipt queues 124.

Classifier 120 applies filters 122 to inbound packets 130 to identify matching filters 122 and assign, based on the respective virtual machine identifiers, the inbound packets 130 to the receipt queues 124 associated to the matching filters 122. In the example of FIG. 4, classifier 120 is configured with mask 168 of length L. When applied by classifier 120, mask 168 enables bits 170 from bit x to bit y (inclusive) in the first L−1 bits of an inbound packet and disables all other bits. Mask 168 is configured to enable bits of inbound packets 130 that include the virtual machine identifiers, and to disable the remaining bits.

In some cases, the number of bits 170 from bit x to bit y (inclusive) is 16 bits/2 bytes. The number of bits 170 may be determined by the capabilities of the NIC 102. For example, flow director filters of the 82599 10 GbE NIC may be configured to match a flexible 16-bit/2-byte tuple in the first 64 bytes of a packet. For this reason, a virtual router according to techniques of this disclosure may allocate virtual machine identifiers from a reduced virtual machine identifier space for the virtual machine identifier type. For instance, while a standard MPLS label space is 20 bits, virtual routers according to techniques described herein may allocate MPLS labels as virtual machine identifiers using, e.g., the least or most significant 16 bits of the MPLS label space. Whereas the MPLS label field remains 20 bits in tunnel packets, the values of the MPLS label of the tunnel encapsulation header in such cases may be (in the least significant bits instances) from 0-65,535. This may limit the number of virtual machines per server to the virtual machine identifier space. As a result of the above, each virtual machine identifier uniquely identifies a local virtual machine to a virtual router, and filters 122 may be defined to match each virtual machine identifier without overloading the match field (defined by bits 170 in the example of FIG. 4) to match multiple virtual machine identifiers. That is, filters 122 may be defined such that no one filter matches multiple virtual machine identifiers and, consequently, each of receipt queues 124 associated to filters 122 may be uniquely associated to a single virtual machine such that the virtual machine receives all (and only) packets destined for that virtual machine as indicated by the virtual machine identifiers of such packets.

FIG. 4 also illustrates an example packet 162 of inbound packets 130. Packet 162 has length K and includes a virtual machine identifier field 164 from bit x to bit y (inclusive). In some cases, the inbound interface of NIC 102 (not shown in FIG. 4) strips an outer L2/Ethernet header from packet 162 on receipt and prior to processing by classifier 120. Accordingly, bit 0 of packet 162 may represent the first bit of an outer L3 header for the underlay network. In some examples, classifier 120 operates only on an outer header or some other portion of data of the packet 162 that includes the virtual machine identifier. For example, classifier 120 may apply mask 168 to only the first 64 bytes of the packet 162.

In this example, classifier 120 applies mask 168 to enable bit x to bit y of packet 162 that include the virtual machine identifier 164, while disabling all other bits of packet 162. Classifier 120 uses the masked result to lookup a matching filter of filters 122. Classifier 120 may in some cases apply a hash to the masked result to generate a hash value as a lookup for match field 126 of filters 122.

Classifier 120 assigns packets 162 to the receipt queue 124 that is associated with the matching filter of filters 122. If no matching filter is found, classifier 120 may provide packet 162 to the virtual router for routing. In such cases, the virtual router may perform a lookup of the destination virtual machine for packet 162 based on the virtual machine identifier 164.

FIGS. 5A-5B are block diagrams illustrating examples of tunnel packets that may be processed by a computing device according to techniques described in this disclosure. For simplicity and ease of illustration, tunnel packets 200, 220 do not illustrate each and every field of a typical tunnel packet but is offered to highlight the techniques described herein. In addition, various implementations may include tunnel packet fields in various orderings.

In the example of FIG. 5A, "outer" or "tunnel" packet 200 for a Layer 2 (L2) overlay includes an outer L2 header 201, an outer header 206, and an inner or "tunneled" or "encapsulated" L2 frame 205. Outer header 206 may include IP or other headers for switching by the underlay network, as well as a tunnel encapsulation header 204. Tunnel encapsulation types for tunnel encapsulation header 204 may include MPLSoGRE, MPLSoUDP, IPinIP, NVGRE, VxLAN, and MPLSoMPLS, for instance. Outer L2 header 201 and destination IP addresses for underlay header 206 (and underlay header 228 of FIG. 5B) for packets may have the same MAC, VLAN, and or destination IP addresses for packets destined for multiple different virtual machines executing on the server that receives the packets. Therefore and according to techniques described herein, a configurable NIC assigns instances of such packets to virtual machines based on a virtual machine identifier within the tunnel encapsulation header.

Tunnel encapsulation header 204 includes a virtual machine identifier field 212 to specify a virtual machine identifier that uniquely identifies a virtual machine to a virtual router for overlay networks. An example of virtual machine identifiers is MPLS labels used in MPLSoGRE encapsulation. Field 210 of tunnel encapsulation header 204 may describe the type of encapsulation, e.g., GRE. L2 frame 205 is an encapsulated L2 frame (e.g., an Ethernet frame) for the L2 overlay. L2 frame 205 is destined for a virtual machine identified by virtual machine identifier 212. Inner header 214 of L2 frame 205 includes an L2 destination address that may also identify the destination virtual machine. According to techniques described herein, a configurable NIC assigns instances of packet 200 to virtual machines based on virtual machine identifier field 212 within the tunnel encapsulation header 204 portion of the outer header 206. Such assignation may occur prior to or instead of "routing" of the packets by virtual routers.

In the example of FIG. 5B, "outer" or "tunnel" packet 220 for a Layer 3 (L3) overlay includes an outer L2 header 221, an outer header 226, and an inner or "tunneled" or "encapsulated" L3 packet 225. Outer header 226 may include IP or other headers for switching by the underlay network, as well as a tunnel encapsulation header 224. Tunnel encapsulation types for tunnel encapsulation header 224 may include MPLSoGRE, MPLSoUDP, IPinIP, NVGRE, VxLAN, and MPLSoMPLS, for instance.

Tunnel encapsulation header 224 includes a virtual machine identifier field 232 to specify a virtual machine identifier that uniquely identifies a virtual machine to a virtual router for overlay networks. An example of virtual machine identifiers is MPLS labels used in MPLSoGRE encapsulation. Field 230 of tunnel encapsulation header 224 may describe the type of encapsulation, e.g., GRE. L3 packet 225 is an encapsulated L3 packet (e.g., an IP packet) for the L3 overlay. L3 frame 226 is destined for a virtual machine identified by virtual machine identifier 232. Inner header 234 of L3 packet 225 includes an L3 destination address that may also identify the destination virtual machine. According to techniques described herein, a configurable NIC assigns instances of packet 220 to virtual machines based on virtual machine identifier field 232 within the tunnel encapsulation header 224 portion of the outer header 226. Such assignation may occur prior to or instead of "routing" of the packets by virtual routers.

Figure 6:
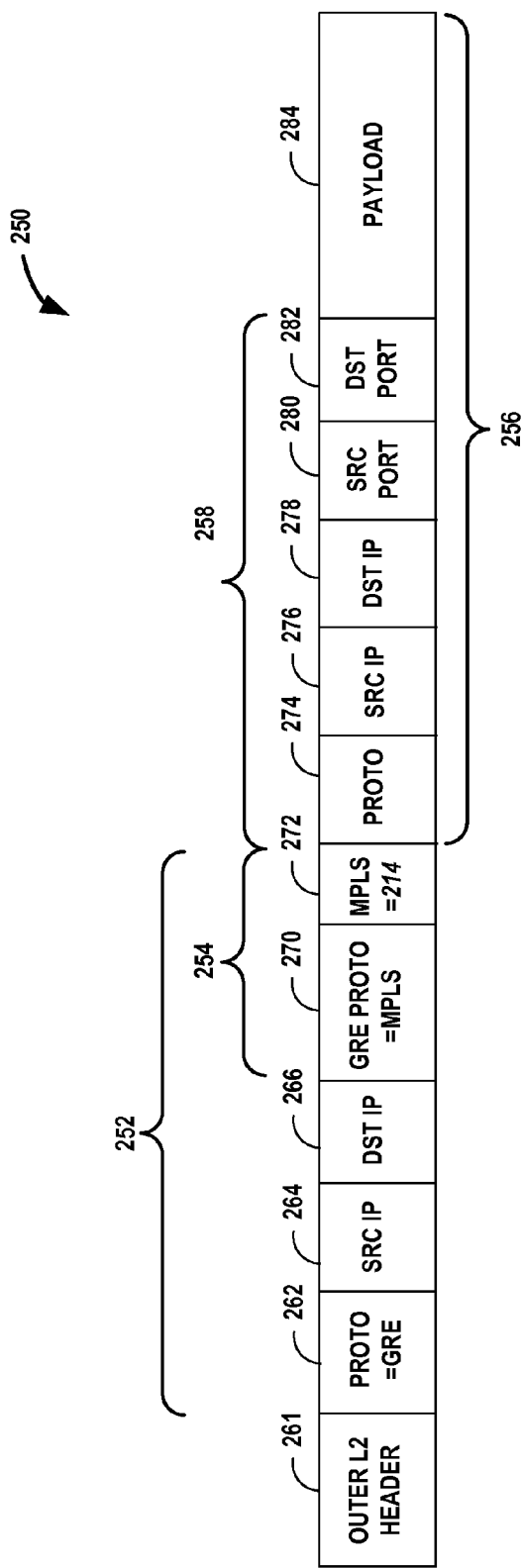
FIG. 6 is a block diagram illustrating, in detail, an example tunnel packet that may be processed by a computing device according to techniques described in this disclosure.

FIG. 6 is a block diagram illustrating, in detail, an example tunnel packet that may be processed by a computing device according to techniques described in this disclosure. For simplicity and ease of illustration, tunnel packet 250 does not illustrate each and every field of a typical tunnel packet but is offered to highlight the techniques described herein. In addition, various implementations may include tunnel packet fields in various orderings. "Outer" or "tunnel" packet 250 includes outer L2 header 261, outer header 252, and inner or "encapsulated" packet 256. Outer header 252 may include protocol or type-of-service (TOS) field 262 and public (i.e., switchable by the underling physical network for a virtual network associated with inner packet 256) IP address information in the form of source IP address field 264 and destination IP address field 266. Protocol field 262 in this example indicates tunnel packet 250 uses GRE tunnel encapsulation, but other forms of tunnel encapsulation may be used in other cases, including IPinIP, NVGRE, VxLAN, and MPLS over MPLS, for instance.

Outer header 252 also includes tunnel encapsulation 254, which in this example includes GRE protocol field 270 to specify the GRE protocol (here, MPLS) and MPLS label field 272 to specify the MPLS label value (here, 214). The MPLS label field is an example of a virtual machine identifier and uniquely identifies a virtual machine executing on a device to which packet 250 is destined according to destination IP address 266. The identified virtual machine may include example instances of virtual machines described herein.

Inner or tunneled packet 256 includes inner header 258 and payload 284. Inner header 258 may include protocol or type-of-service (TOS) field 274 as well as private (i.e., for a particular virtual routing and forwarding instance) IP address information in the form of source IP address field 276 and destination IP address field 278, along with transport layer information in the form of source port field 280 and destination port field 282. Payload 284 may include application layer (layer 7 (L7)) and in some cases other L4-L7 information produced by or for consumption by a virtual machine for the virtual network. Payload 284 may include and thus alternatively be referred to as an "L4 packet," "UDP packet," or "TCP packet."

Figure 7:
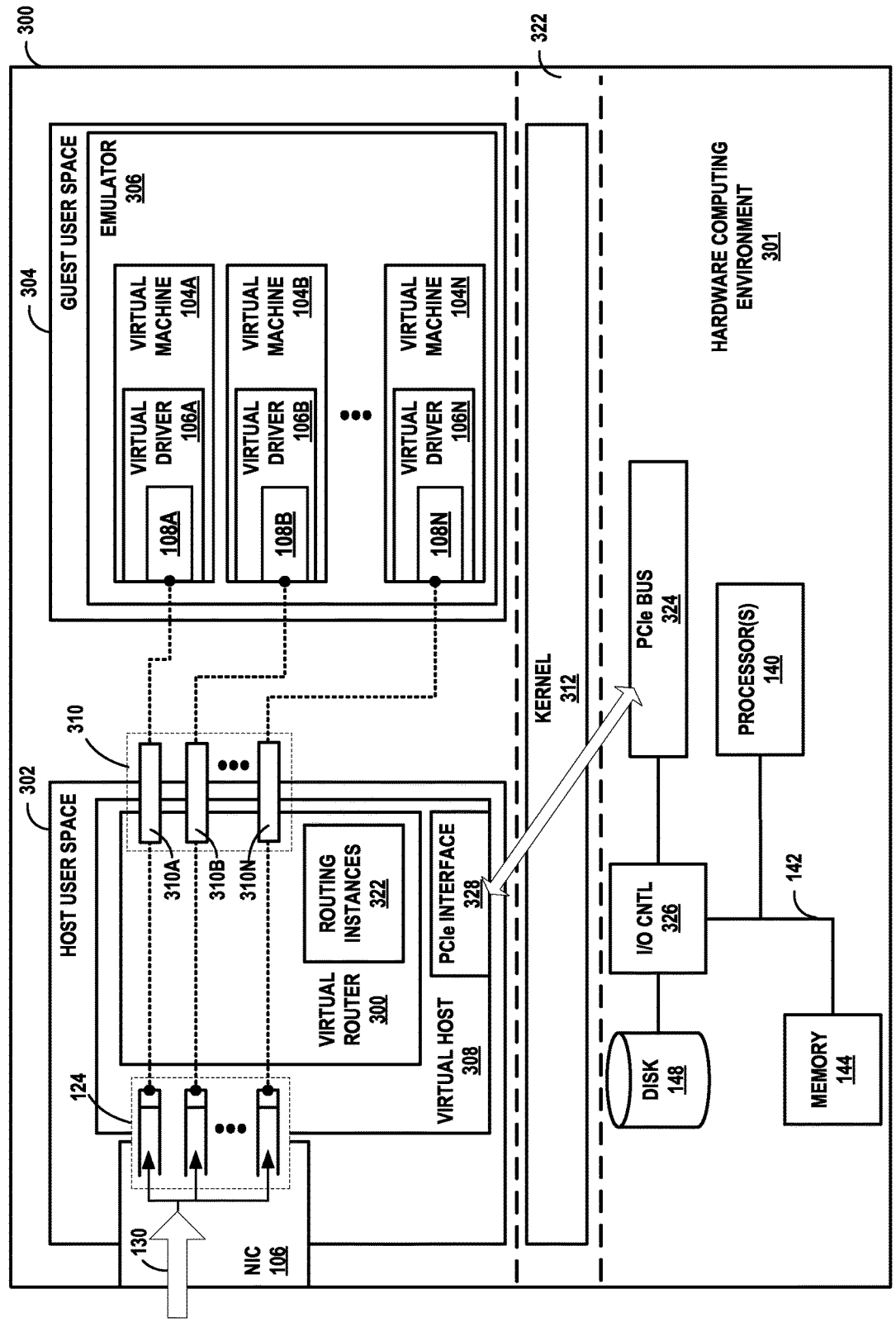
FIG. 7 is a block diagram illustrating an example architecture for a computing device configured to directly send packet data for inbound tunneled packets to destination virtual machines executing on the computing device.

FIG. 7 is a block diagram illustrating an example architecture for a computing device configured to directly send packet data for inbound tunneled packets to destination virtual machines executing on the computing device. Computing device 300 may represent an example instance of any of servers 12, 29, and 50, and of computing device 100.

In this example of a computing device operating according to techniques of this disclosure, a virtual router 300 for overlay networks is executed by a virtual host 308 executing in user space (host user space 302) for the computing device 300. Routing instances 322 each include routing information for one of the overlay networks. An example framework for implementing a virtual host and offloading of services of virtual machine virtio-net devices to a user space application is provided by a Data Plane Development Kit (DPDK). An example of a DPDK is the Intel© DPDK developed by Intel© Corporation.

Because virtual host 308 executes in user space, emulator 306 may share information describing the physical address spaces of virtual machines 104 with the virtual host 308 to enable mapping of the virtual machines 104 physical memories into the address space of virtual host 308. As a result, NIC 106 may write packet data directly to the address spaces of virtual machines 104. In order to "route" inbound packets 130 in such cases, virtual router 300 may copy, from receipt queues 124 to transport buffers 310 and rather than copying entire packets from host user space 302, merely descriptions of the corresponding packet data (e.g., in a descriptor) that describes a memory location and a length of the packet data. This may reduce internal copying of packet data overall, which may improve forwarding throughput of computing device 300. Emulator 306 represents a device emulator, such as Quick Emulator (QEMU), and provides virtualization for virtual machines 104. In this sense, emulator 306 operates as a Hypervisor.

Transport buffers 310A-310N (collectively, "transport buffers 310") for respective virtual drivers 106 enable communication between virtual drivers 106 and the virtual device for NIC 106 emulated by the virtual host 308. Transport buffer 310A, for instance, may represent one or more queues for exchanging data between virtual driver 106A and virtual host 308. Transport buffers 310 may include virtio rings.

Using transport buffers 310, virtual drivers 106 may post addresses for receipt buffers 108 for receipt queues 124. For example, receipt queue 124A may receive empty receipt descriptors from virtual driver 106A via transport buffer 310A. The empty receipt descriptors may include (or be mapped from the virtual machine 104A address space by virtual host 308 to include) packet data buffer memory locations receipt buffer 108A.

Upon receiving a packet of inbound packets 130 and assigning the packet to receipt queue 124A for virtual machine 104A, NIC 106 may write packet data for the packet to a packet data buffer memory location indicated by an empty receipt descriptor. NIC 106 may further populate the no longer empty receipt descriptor with a description of the packet data (e.g., length), and advance the receipt queue 124A to indicate to virtual router 300 that a new packet has been pushed to receipt queue 124A. Virtual router 300 may then copy values of the receipt descriptor from receipt queue 124A to virtual driver 106A to indicate to virtual machine 106A that the new packet has been copied to buffer 108A.

NIC 106 may directly write packet data to receipt buffers 108 by issuing a DMA request. For example, computing device 300 includes PCIe interface 328 that connects to PCIe bus 324 of computing device 300 for communication with PCIe-based devices. PCIe interface 145 may provide a physical layer, data link layer and a transaction layer for supporting PCIe-based communications between NIC 106, processor(s) 140, and/or memory 144. As such, PCIe interface 328 is responsive to read/write requests from virtual host 308 for sending and/or receiving packet data in accordance with the PCIe protocol.

In this example, computing device 300 includes a system bus 142 coupling hardware components of hardware computing environment 301. System bus 142 couples processor(s) 140 to memory 144 and input/output (I/O) controller 326. I/O controller 326 provides access to storage disk 148 and NIC 106 via PCIe bus 324.

Figure 8:
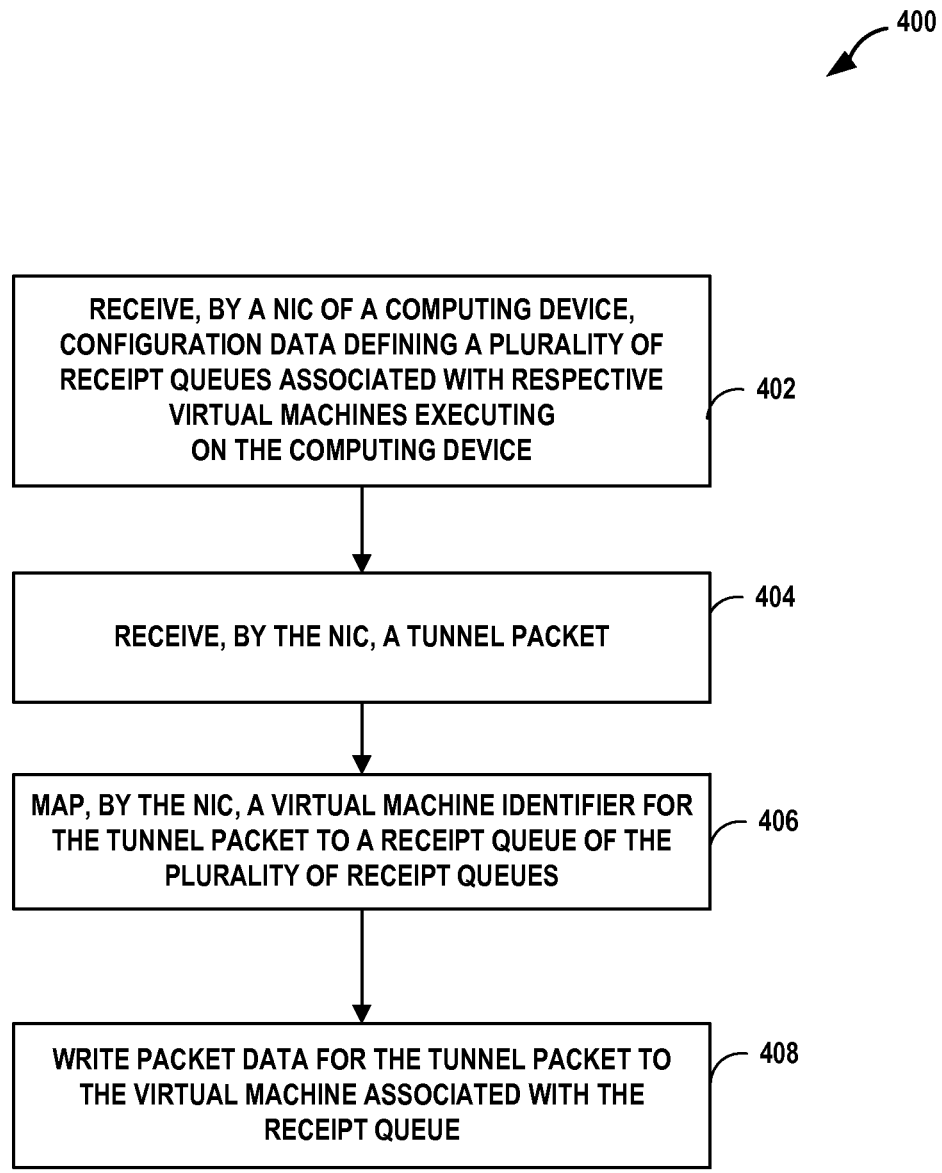
FIG. 8 is a flowchart illustrating an example mode of operation for a computing device having a configurable network interface card, the computing device operating according to techniques described in this disclosure.

FIG. 8 is a flowchart illustrating an example mode of operation for a computing device having a configurable network interface card, the computing device operating according to techniques described in this disclosure. Operation 400 is described for illustrative purposes with respect to server 50A of FIG. 2B. Server 50A includes network interface card (NIC) 13A that receives configuration data from a virtual routing process executing on the server, the configuration data defining a plurality of receipt queues 37 each associated with a different one of virtual machines 36 also executing on server 50A (402). Subsequently, NIC 13A receives an inbound (i.e., from the switch fabric) tunnel packet for one of virtual networks 34 (404). The NIC 13A maps a virtual machine identifier included in a header of the inbound tunnel packet to, e.g., receipt queue 37A (406). The NIC 13A may then write packet data for the inbound tunnel packet to the virtual machine 37A associated with receipt queue 37A (408). The packet data may include the inner packet of the inbound tunnel packet.

Figure 9:
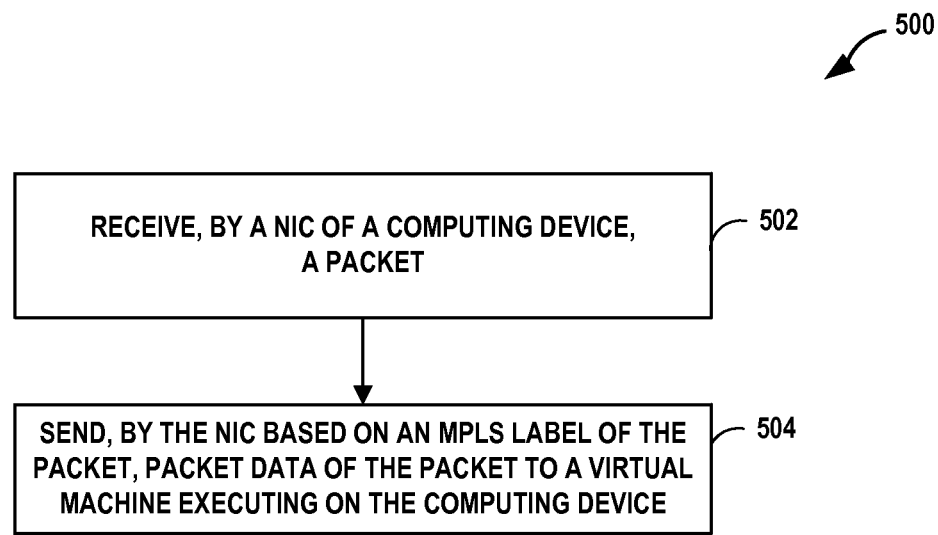
FIG. 9 is a flowchart illustrating an example mode of operation for a computing device having a configurable network interface card, the computing device operating according to techniques described in this disclosure.

FIG. 9 is a flowchart illustrating an example mode of operation for a computing device having a configurable network interface card, the computing device operating according to techniques described in this disclosure. Operation 500 is described for illustrative purposes with respect to server 12A of FIG. 1. NIC 13A of server 12A receives a packet from the switch fabric 14 (502). Based on an MPLS label of an encapsulation portion of the packet, NIC 13A sends packet data of the packet to virtual machine $21A_2$ executed by server 12A (504). In this way, NIC 13A may offload, from other processors of server 12, a portion of the switching functionality for routing packets among virtual machines interconnected by one or more virtual networks.

The techniques described herein, including in the preceding any of sections, may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   receiving, by a network interface card (NIC) of a computing device, configuration data defining a plurality of receipt queues of the NIC and associated with respective virtual machines executing on the computing device; and
   assigning, by the NIC and based on respective virtual machine identifiers included in tunnel encapsulation information of packets received by the NIC, each of the virtual machine identifiers uniquely identifying a corresponding one of the virtual machines executing on the computing device, the packets to the plurality of receipt queues associated with the respective virtual machines.

2. The method of claim 1,
   wherein the virtual machine identifiers included in tunnel encapsulation information of the packets comprise one of Multiprotocol Label Switching (MPLS) labels and Generalized MPLS (GMPLS) labels.

3. The method of claim 1, further comprising:
   executing, by the computing device, a virtual router for one or more virtual networks;
   receiving, by the NIC, the packets from a switch fabric comprising a plurality of switches interconnected to form a physical network that switches packets for the one or more virtual networks,
   wherein each of the packets comprises an outer header encapsulating a tunneled packet destined for one of the virtual machines.

4. The method of claim 3,
   wherein the outer header of each packet of the packets comprises a destination network address of the computing device,
   wherein the outer header of each packet of the packets comprises the virtual machine identifier of the packet.

5. The method of claim 3,
   wherein a tunnel encapsulation header of each packet of the packets identifies a virtual network of the one or more virtual networks, and
   wherein the tunnel encapsulation header of each packet of the packets comprises the virtual machine identifier of the packet.

6. The method of claim 3,
   wherein a virtual network controller configures and manages the one or more virtual networks within the physical network, and
   wherein the computing device comprises a server of a plurality of servers interconnected by the switch fabric,
   wherein each of the servers comprises an operating environment executing virtual machines in communication via the one or more virtual networks, and
   wherein the servers execute a set of virtual routers that extends the one or more virtual networks to the virtual machines.

7. The method of claim 1, wherein the virtual machines have isolated address spaces.

8. The method of claim 1, further comprising:
   directly sending, by the NIC based on assigning a first packet of the packets to a first receipt queue of the plurality of receipt queues, packet data of the first packet to a first virtual machine of the virtual machines associated with the first receipt queue.

9. The method of claim 8, wherein directly sending the first packet to the first virtual machine comprising writing, by the NIC via a direct memory access (DMA) transfer, packet data of the first packet to a receipt buffer in an address space of the first virtual machine.

10. The method of claim 8, further comprising:
    executing, by the computing device, a virtual router for one or more virtual networks,
    wherein directly sending the first packet to the first virtual machine comprises sending, by the NIC, packet data of the first packet to the first virtual machine without writing the packet data to an address space of the virtual router.

11. The method of claim 1, further comprising:
    executing, by the computing device, a virtual router for one or more virtual networks,
    wherein the virtual machine identifiers included in tunnel encapsulation information of the packets comprise Multiprotocol Label Switching (MPLS) labels, and
    wherein the virtual router allocates respective MPLS labels for identifying the virtual machines from a reduced MPLS label space that is reduced from the MPLS label space, the reduced MPLS label space being defined by one of the N most significant bits of the MPLS label space and the N least significant bits of the MPLS label space.

12. The method of claim 1, further comprising:
    receiving, by the NIC, configuration data defining a plurality of filters that map respective virtual machine identifiers to respective receipt queues,
    wherein assigning the packets to the plurality of receipt queues comprises matching respective virtual machine identifiers included in tunnel encapsulation information of the packets to respective filters of the plurality of filters.

13. The method of claim 12, wherein each filter of the plurality of filters matches an N-bit field of the packets, the N-bit field including the virtual machine identifiers.

14. A method comprising:
    receiving, by a network interface card (NIC) of a computing device, a packet; and
    sending, by the NIC based on a Multiprotocol Label Switching label of the packet, the Multiprotocol Label Switching label uniquely identifying a corresponding one of a plurality of virtual machines executing on the computing device, packet data of the packet directly to the corresponding virtual machine of the plurality of virtual machines.

15. The method of claim 14, wherein sending the packet directly to the virtual machine comprises writing, by the NIC via a direct memory access (DMA) transfer, packet data of the packet to an address space of the virtual machine.

16. A computing device comprising:
one or more processors configured to execute a plurality of virtual machines; and
a network interface card (NIC) coupled to the one or more processors and configured to receive configuration data defining a plurality of receipt queues of the NIC and associated with respective virtual machines of the plurality of virtual machines,
wherein the NIC is further configured to assign, based on respective virtual machine identifiers included in tunnel encapsulation information of packets received by the NIC, each of the virtual machine identifiers uniquely identifying a corresponding one of the virtual machines executing on the computing device, the packets to the plurality of receipt queues associated with the respective virtual machines.

17. The computing device of claim 16, wherein the virtual machine identifiers included in tunnel encapsulation information of the packets comprise one of Multiprotocol Label Switching (MPLS) labels and Generalized MPLS (GMPLS) labels.

18. The computing device of claim 16,
wherein the one or more processors are further configured to execute a virtual router for one or more virtual networks,
wherein the NIC is further configured to receive the packets from a switch fabric comprising a plurality of switches interconnected to form a physical network that switches packets for the one or more virtual networks, and
wherein each of the packets comprises an outer header encapsulating a tunneled packet destined for one of the plurality of virtual machines.

19. The computing device of claim 18,
wherein the outer header of each packet of the packets comprises a destination network address of the computing device,
wherein the outer header of each packet of the packets comprises the virtual machine identifier of the packet.

20. The computing device of claim 18,
wherein a tunnel encapsulation header of each packet of the packets identifies a virtual network of the one or more virtual networks, and
wherein the tunnel encapsulation header of each packet of the packets comprises the virtual machine identifier of the packet.

21. The computing device of claim 18,
wherein a virtual network controller configures and manages the one or more virtual networks within the physical network, and
wherein the computing device comprises a server of a plurality of servers interconnected by the switch fabric, wherein each of the servers comprises an operating environment executing virtual machines in communication via the one or more virtual networks, and wherein the servers execute a set of virtual routers that extends the one or more virtual networks to the virtual machines.

22. The computing device of claim 16, wherein the virtual machines have isolated address spaces.

23. The computing device of claim 16,
wherein the NIC is configured to direct send, based on assigning a first packet of the packets to a first receipt queue of the plurality of receipt queues, packet data of the first packet to a first virtual machine of the virtual machines associated with the first receipt queue.

24. The computing device of claim 23, wherein to directly send the first packet to the first virtual machine the NIC is configured to write, via a direct memory access (DMA) transfer, packet data of the first packet to a receipt buffer in an address space of the first virtual machine.

25. The computing device of claim 23,
wherein the one or more processors are further configured to execute a virtual router for one or more virtual networks, and
wherein to directly send the first packet to the first virtual machine the NIC is configured to send packet data of the first packet to the first virtual machine without writing the packet data to an address space of the virtual router.

26. The computing device of claim 16,
wherein the one or more processors are further configured to execute a virtual router for one or more virtual networks,
wherein the virtual machine identifiers included in tunnel encapsulation information of the packets comprise Multiprotocol Label Switching (MPLS) labels, and
wherein the one or more processors are further configured to execute the virtual router to allocate respective MPLS labels for identifying the virtual machines from a reduced MPLS label space that is reduced from the MPLS label space, the reduced MPLS label space being defined by one of the N most significant bits of the MPLS label space and the N least significant bits of the MPLS label space.

27. The computing device of claim 16,
wherein the NIC is further configured to receive configuration data defining a plurality of filters that map respective virtual machine identifiers to respective receipt queues,
wherein to assign the packets to the plurality of receipt queues the NIC is further configured to match respective virtual machine identifiers included in tunnel encapsulation information of the packets to respective filters of the plurality of filters.

28. The computing device of claim 27, wherein each filter of the plurality of filters matches an N-bit field of the packets, the N-bit field including the virtual machine identifiers.

29. A computing device comprising:
one or more processors configured to execute a plurality of virtual machines; and
a network interface card (NIC) coupled to the one or more processors and configured to receive a packet,
wherein the NIC is further configured to send, based on a Multiprotocol Label Switching label of the packet, the Multiprotocol Label Switching label uniquely identifying a corresponding one of the plurality of virtual machines executing on the computing device, packet data of the packet directly to the corresponding virtual machine of the plurality of virtual machines.

30. The computing device of claim 29, wherein to send the packet directly to the virtual machine the NIC is further configured to write, via a direct memory access (DMA) transfer, packet data of the packet to an address space of the virtual machine.

31. A non-transitory computer-readable medium comprising instructions for causing one or more programmable processors to:
receive, by a network interface card (NIC) of a computing device, configuration data defining a plurality of receipt queues of the NIC and associated with respective virtual machines configured for execution by the one or more programmable processors; and assign, by the NIC and based on respective virtual machine identifiers included in tunnel encapsulation information of packets received by the NIC, each of the virtual machine identifiers uniquely identifying a corresponding one of the virtual machines executing on the computing device, the packets to the plurality of receipt queues associated with the respective virtual machines.

32. A non-transitory computer-readable medium comprising instructions for causing one or more programmable processors to:

receive, by a network interface card (NIC) of a computing device, a packet; and send, by the NIC based on a Multiprotocol Label Switching label of the packet, the Multiprotocol Label Switching label uniquely identifying a corresponding one of a plurality of virtual machines configured for execution by the one or more programmable processors, packet data of the packet directly to the corresponding virtual machine of the plurality of virtual machines, wherein sending the packets directly to the corresponding virtual machine comprises sending the packets to the corresponding virtual machine without a software-based virtual router executed by a general-purpose processor of the computing device accessing the Multiprotocol Label Switching label of the packet.

* * * * *